United States Patent
Niwa

(10) Patent No.: US 10,838,474 B2
(45) Date of Patent: Nov. 17, 2020

(54) ELECTRIC POWER SUPPLY SYSTEM

(71) Applicant: TOYOTA JIDOSHA KABUSHIKI KAISHA, Toyota (JP)

(72) Inventor: Hisao Niwa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/259,004

(22) Filed: Jan. 28, 2019

(65) Prior Publication Data
US 2019/0243434 A1    Aug. 8, 2019

(30) Foreign Application Priority Data

Feb. 6, 2018    (JP) ................................ 2018-019428

(51) Int. Cl.
*G06F 1/26* (2006.01)
*H02H 3/00* (2006.01)
*H02J 3/14* (2006.01)

(52) U.S. Cl.
CPC ............ *G06F 1/263* (2013.01); *H02H 3/006* (2013.01); *H02J 3/14* (2013.01)

(58) Field of Classification Search
USPC ....................................................... 700/286
See application file for complete search history.

(56) References Cited

U.S. PATENT DOCUMENTS

| | | | |
|---|---|---|---|
| 2005/0035656 A1* | 2/2005 | Kuramochi | H02J 1/08 307/10.1 |
| 2019/0184922 A1* | 6/2019 | Tazarine | B60L 58/21 |
| 2019/0337475 A1* | 11/2019 | Kawamura | H02J 7/34 |

FOREIGN PATENT DOCUMENTS

| | | | |
|---|---|---|---|
| DE | 102015101235 A1 * | 7/2016 | B60R 16/03 |
| JP | H05-064361 A | 3/1993 | |
| JP | 2016-037102 A | 3/2016 | |

OTHER PUBLICATIONS

Satpathi et al., "Directional Protection Scheme for MVDC Shipboard Power Systems" IECON 2016—42nd Annual Conference of the IEEE Industrial Electronics Society, Oct. 23-26, 2016, pp. 3840-3847 (Year: 2016).*

* cited by examiner

*Primary Examiner* — Emilio J Saavedra
(74) *Attorney, Agent, or Firm* — Oliff PLC

(57) ABSTRACT

An electric power supply system includes: a load; a first switch configured to connect a first electric power supply unit and the load to each other by a first route; a second switch configured to connect the first electric power supply unit and the load to each other by a second route; a third switch configured to connect a second electric power supply unit and the load to each other by a third route; a fourth switch configured to connect the second electric power supply unit and the load to each other by a fourth route; a first rectifying device provided in the second route and configured to carry out rectification from the first electric power supply unit toward the load; and a second rectifying device provided in the fourth route and configured to carry out rectification from the second electric power supply unit toward the load.

4 Claims, 8 Drawing Sheets

ELECTRIC POWER SUPPLY SYSTEM

INCORPORATION BY REFERENCE

The disclosure of Japanese Patent Application No. 2018-019428 filed on Feb. 6, 2018 including the specification, drawings and abstract is incorporated herein by reference in its entirety.

BACKGROUND

1. Technical Field

The disclosure relates to an electric power supply system.

2. Description of Related Art

In Japanese Patent Application Publication No. 2016-037102 (JP 2016-037102 A), there is disclosed a vehicular electric power supply system having two batteries in a redundant configuration. This electric power supply system is equipped with a generator, a first battery that is connected to the generator by a wiring of a first line, and a second battery that is connected to the generator by a wiring of a second line that is provided in parallel with the first line, and can thereby supply electric power to loads from the second line as well as the first line.

SUMMARY

In the electric power supply system described in the aforementioned Japanese Patent Application Publication No. 2016-037102 (JP 2016-037102 A), electric power is supplied to the various loads by exclusively using an electric power supply of the first line that is constituted of the generator and the first battery, to cause a vehicle to run, and the second battery of the second line is redundantly installed as a backup battery for supplying required electric power to the loads (hereinafter referred to as "the important loads") that perform important functions for safely evacuating the vehicle in case of emergency, for example, at the time when the electric power supply of the first line malfunctions. Therefore, there is room for improvement in the electric power supply system in view of the cost of the mounted batteries.

The disclosure provides an electric power supply system that can maintain the supply of electric power to important loads in case of emergency and that can cut down on the cost of the system through omission of a battery for backup.

An electric power supply system according to an aspect of the disclosure includes a first electric power supply unit, a second electric power supply unit, a load configured to be supplied with electric power from the first electric power supply unit and the second electric power supply unit, a first switch configured to connect the first electric power supply unit and the load to each other by a first route, and disconnect the first electric power supply unit and the load from each other when an overcurrent flows through the first route, a second switch configured to connect the first electric power supply unit and the load to each other by a second route, and disconnect the first electric power supply unit and the load from each other when the overcurrent flows through the second route, a third switch configured to connect the second electric power supply unit and the load to each other by a third route, and disconnect the second electric power supply unit and the load from each other when the overcurrent flows through the third route, a fourth switch configured to connect the second electric power supply unit and the load to each other by a fourth route, and disconnect the second electric power supply unit and the load from each other when the overcurrent flows through the fourth route, a first rectifying device provided in the second route and configured to carry out rectification from the first electric power supply unit toward the load, and a second rectifying device provided in the fourth route and configured to carry out rectification from the second electric power supply unit toward the load.

In the aforementioned aspect, the plurality of the switches that carry out disconnection when an overcurrent flows and the plurality of the rectifying devices are employed, and the four routes, namely, the first route that is connected to the first electric power supply unit via one of the switches, the second route that is connected to the first electric power supply unit via another one of the switches and one of the rectifying devices, the third route that is connected to the second electric power supply unit via another one of the switches, and the fourth route that is connected to the second electric power supply unit via the other switch and the other rectifying device are configured as routes for supplying electric power to important loads.

According to the aforementioned aspect, even when a ground fault, namely, the flow of an overcurrent or the like occurs in one of the routes, the route in which the ground fault has occurred can be separated from the other routes. In consequence, even in the case where no battery for backup is provided, the supply of electric power to the important loads in case of emergency can be maintained through the use of the first electric power supply unit and/or the second electric power supply unit that are/or connected to the other route(s).

The electric power supply system according to the aforementioned aspect may further include a control apparatus configured to control a plurality of switches including the first to fourth switches and one or more switches other than the first to fourth switches. Each of the plurality of the switches may be configured to convey information on the flow of the overcurrent and a direction of flow of the overcurrent to the control apparatus. The control apparatus may be configured to specify an occurrence location where the overcurrent has occurred, based on the information conveyed by the plurality of the switches, and issue a command on a connection state to each of the plurality of the switches so as to separate the generation location from the route. Each of the plurality of the switches may be configured to make a changeover in connection state based on the command from the control apparatus.

According to the aforementioned aspect, only the switch closest to the location where the overcurrent has occurred can be disconnected, so the location where the overcurrent has occurred can be separated from the first electric power supply unit and/or the second electric power supply unit within a range with a rather weak influence. Accordingly, it is possible to continue to supply electric power to the loads other than those which can be supplied with electric power from the first electric power supply unit and the second electric power supply unit, as well.

The electric power supply system according to the aforementioned aspect may further include a connection control unit configured to connect the first electric power supply unit and the second electric power supply unit to each other after each of the plurality of the switches makes a changeover in connection state based on the command from the control apparatus.

According to the aforementioned aspect, even after a ground fault, namely, the flow of the overcurrent or the like has occurred, electric power can be made available between the first electric power supply unit and the second electric power supply unit. In consequence, for example, in the case where the first electric power supply unit is a generator and the second electric power supply unit is a battery, even when fluctuations in voltage occur in the generator, the battery can absorb the fluctuations. Besides, in this case, even when the discharge of the battery progresses, the battery can be charged by the generator.

In the aforementioned aspect, the first electric power supply unit may be a generator, and the second electric power supply unit may be a battery.

The electric power supply system according to the aforementioned aspect can maintain the supply of electric power to the important loads in case of emergency, and cut down on the cost of the system through omission of the battery for backup.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Outline

An electric power supply system according to the aspect of the disclosure employs a plurality of switches that carry out disconnection when an overcurrent flows therethrough, and a plurality of rectifying devices, and configures a first route that is connected to a generator via one of the switches, a second route that is connected to the generator via another one of the switches and one of the rectifying devices, a third route that is connected to a battery via another one of the switches, and a fourth route that is connected to the battery via the other switch and the other rectifying device, as routes for supplying electric power to important loads. Owing to this configuration, even when an overcurrent flows through one of the routes, the route through which the overcurrent has flowed can be separated from the other routes.

First Embodiment

[Configuration]

Figure 1:
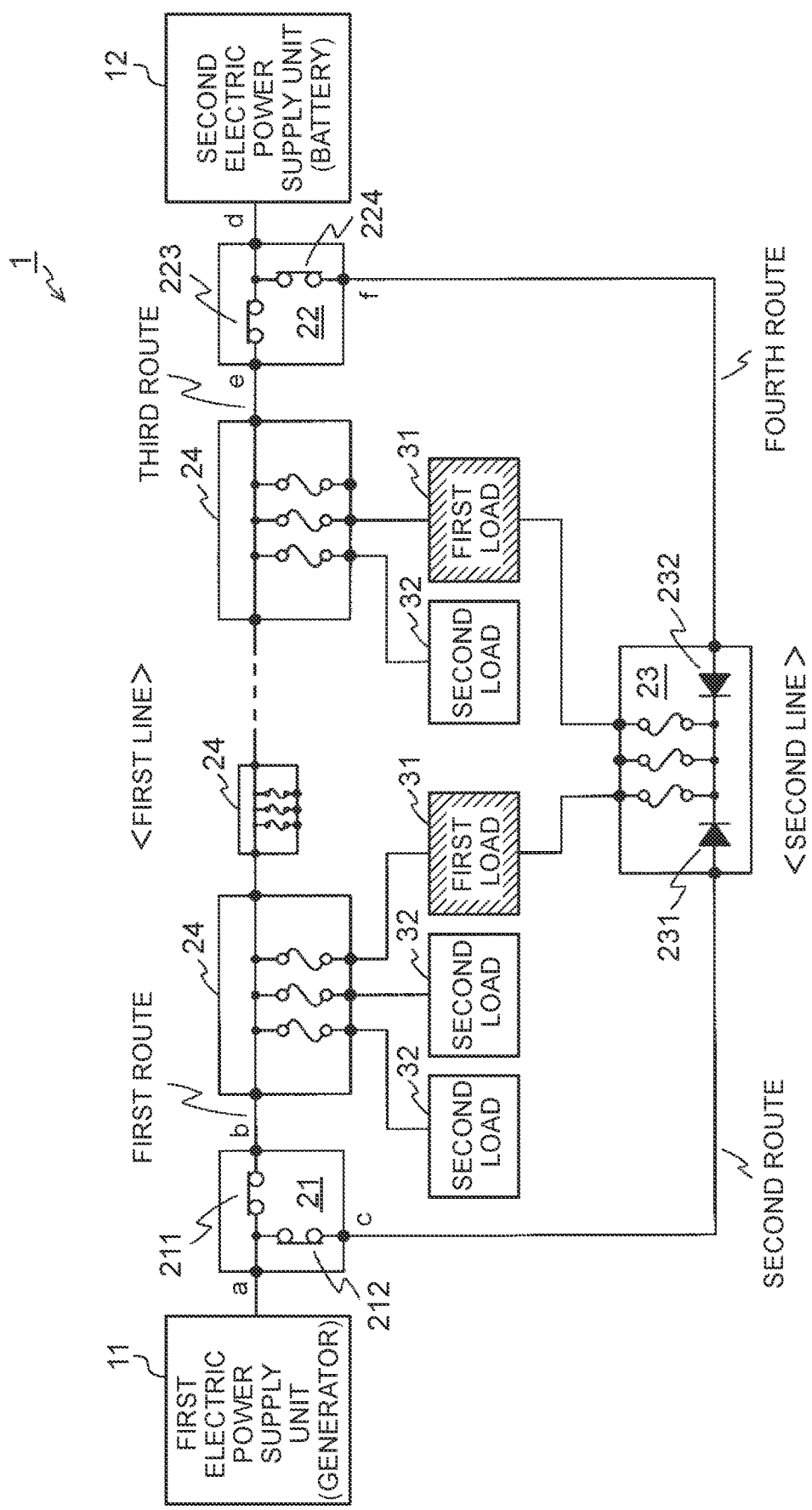
FIG. 1 is a view showing the overall configuration of an electric power supply system according to the first embodiment of the disclosure.

FIG. 1 is a view showing the overall configuration of an electric power supply system 1 according to the first embodiment. The electric power supply system 1 exemplified in FIG. 1 is configured to be equipped with a first electric power supply unit 11, a second electric power supply unit 12, a first connection changeover unit 21 and a second connection changeover unit 22 that are provided between the first electric power supply unit 11 and the second electric power supply unit 12, a plurality of distributors 24 that are arranged between the first connection changeover unit 21 and the second connection changeover unit 22, and a rectifier-equipped distributor 23 that is provided in parallel with the plurality of the distributors 24.

An electric power supply line that is constituted of the first electric power supply unit 11, the first connection changeover unit 21, the plurality of the distributors 24, the second connection changeover unit 22, and the second electric power supply unit 12 will be referred to as "a first line", and an electric power supply line that is constituted of the first electric power supply unit 11, the first connection changeover unit 21, the rectifier-equipped distributor 23, the second connection changeover unit 22, and the second electric power supply unit 12 will be referred to as "a second line".

A plurality of first loads 31 and a plurality of second loads 32 are connected between the rectifier-equipped distributor 23 and the plurality of the distributors 24. Each of the first loads 31 is an important load that needs to be supplied with electric power from an electric power supply of the second line even when an electric power supply of the first line malfunctions, and can be a load that performs an important function for safely evacuating a vehicle in case of emergency, for example, when the electric power supply of the first line malfunctions in automatic driving. Each of the second loads 32 is a normal load. Incidentally, the number of first loads 31 and the number of second loads 32 are not limited as shown in FIG. 1. Any required number of first loads 31 and any required number of second loads 32 can be connected to the electric power supply system 1.

The first electric power supply unit 11 is configured to be able to supply electric power to the plurality of the first loads 31 and the plurality of the second loads 32, and is typically a generator such as an alternator or the like. Besides, this first electric power supply unit 11 can be, for example, a DCDC converter that converts an input electric power supply voltage into a predetermined electric power supply voltage and that outputs the predetermined electric power supply voltage, or a battery (a capacitor) that is configured in a rechargeable manner, such as a lithium-ion battery or the like.

The second electric power supply unit 12 is configured to be able to supply electric power to the plurality of the first loads 31 and the plurality of the second loads 32, and is typically a battery (a capacitor) that is configured in a rechargeable manner, such as a lithium-ion battery or the like. Besides, this second electric power supply unit 12 can be, for example, a generator such as an alternator or the like, or a DCDC converter that converts an input electric power supply voltage into a predetermined electric power supply voltage and that outputs the predetermined electric power supply voltage.

The first connection changeover unit 21 is configured to be equipped with a switch 211 (hereinafter referred to as "a first switch") and a switch 212 (hereinafter referred to as "a second switch"), each of which has an overcurrent protection function and includes, for example, a semiconductor device. In this first connection changeover unit 21, one terminal a of each of the first switch 211 and the second switch 212 is directly connected to the first electric power supply unit 11, the other terminal b of the first switch 211 is connected to the first loads 31 and the second loads 32 via the distributor 24, and the other terminal c of the second switch 212 is connected to the first loads 31 via the rectifier-equipped distributor 23. A route through which the first electric power supply unit 11 is connected to the first load 31 and the second loads 32 via the first switch 211 will be referred to as "a first route", and a route through which the first electric power supply unit 11 is connected to the first loads 31 via the second switch 212 will be referred to as "a second route".

In this first connection changeover unit 21, the first switch 211 normally connects one terminal a and the other terminal b to each other, and operates to disconnect one terminal a and the other terminal b from each other when a current (an overcurrent) that is equal to or larger than a predetermined value flows between the terminals. Besides, the second switch 212 normally connects one terminal a and the other terminal c to each other, and operates to disconnect one terminal a and the other terminal c from each other when a current (an overcurrent) that is equal to or larger than the predetermined value flows between the terminals.

The second connection changeover unit 22 is configured to be equipped with a switch 223 (hereinafter referred to as "a third switch") and a switch 224 (hereinafter referred to as "a fourth switch"), each of which has an overcurrent protection function and includes, for example, a semiconductor device. In this second connection changeover unit 22, one terminal d of each of the third switch 223 and the fourth switch 224 is directly connected to the second electric power supply unit 12, the other terminal e of the third switch 223 is connected to the first load 31 and the second load 32 via the distributor 24, and the other terminal f of the fourth switch 224 is connected to the first loads 31 via the rectifier-equipped distributor 23. A route through which the second electric power supply unit 12 is connected to the first load 31 and the second load 32 via the third switch 223 will be referred to as "a third route", and a route through which the second electric power supply unit 12 is connected to the first loads 31 via the fourth switch 224 will be referred to as "a fourth route".

In this second connection changeover unit 22, the third switch 223 normally connects one terminal d and the other terminal e to each other, and operates to disconnect one terminal d and the other terminal e from each other when a current (an overcurrent) that is equal to or larger than a predetermined value flows between the terminals. Besides, the fourth switch 224 normally connects one terminal d and the other terminal f to each other, and operates to disconnect one terminal d and the other terminal f from each other when a current (an overcurrent) that is equal to or larger than the predetermined value flows between the terminals.

The rectifier-equipped distributor 23 is provided between the second switch 212 and the fourth switch 224, and is configured to distribute and supply the electric power from the electric power supply of the second line to the first loads 31. This rectifier-equipped distributor 23 includes a first rectifying device 231 that carries out rectification from the first electric power supply unit 11 toward the plurality of the first loads 31 in the second route, and a second rectifying device 232 that carries out rectification from the second electric power supply unit 12 toward the plurality of the first loads 31 in the fourth route.

The plurality of the distributors 24 are each provided between the first switch 211 and the third switch 223, and are configured to distribute and supply the electric power from the electric power supply of the first line to the plurality of the first loads 31 and the plurality of the second loads 32.

[Control]

Next, the control performed by the electric power supply system 1 according to the first embodiment will be described with further reference to FIGS. 2A to 6B. Each of the drawings is a view exemplifying a control state at the time when an overcurrent flows due to a ground fault at an arbitrary location. Incidentally, in a normal state before the occurrence of the ground fault in each of the drawings, electric power is supplied in a parallel manner to the plurality of the first loads 31 and the plurality of the second loads 32 through the use of both the first line and the second line.

Figure 2A:
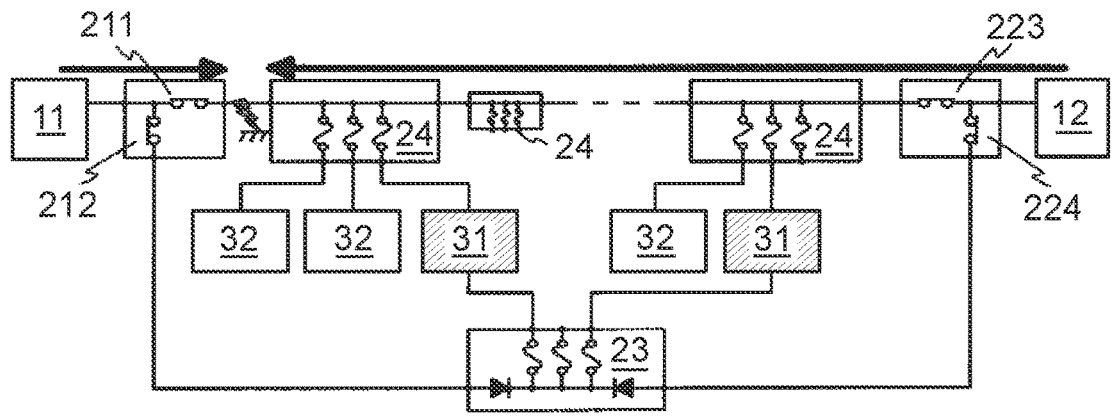
FIG. 2A is a view illustrating control performed by the electric power supply system according to the first embodiment.
Figure 2B:
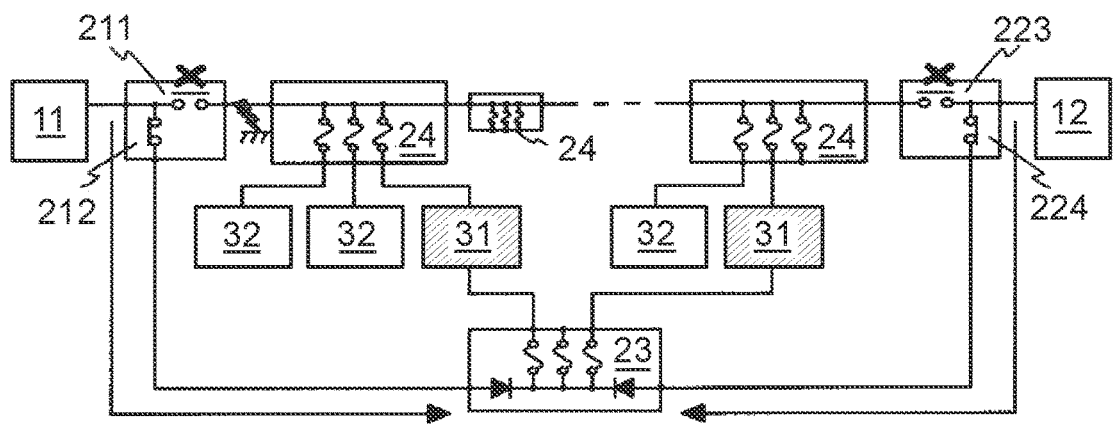
FIG. 2B is a view illustrating control performed by the electric power supply system according to the first embodiment.

When a ground fault occurs at a location shown in FIG. 2A (on the first route), a large current flows from the first electric power supply unit 11 toward the location of the ground fault via the first switch 211, and a large current flows from the second electric power supply unit 12 toward the location of the ground fault via the third switch 223. In this case, as shown in FIG. 2B, the first switch 211 and the third switch 223 carry out disconnection upon detecting the flow of an overcurrent. Due to this control, the location of the ground fault is separated from the first electric power supply unit 11 and the second electric power supply unit 12, and the supply of electric power from the first electric power supply unit 11 and the second electric power supply unit 12 to the plurality of the first loads 31 via the second route and the fourth route is continued.

Figure 3A:
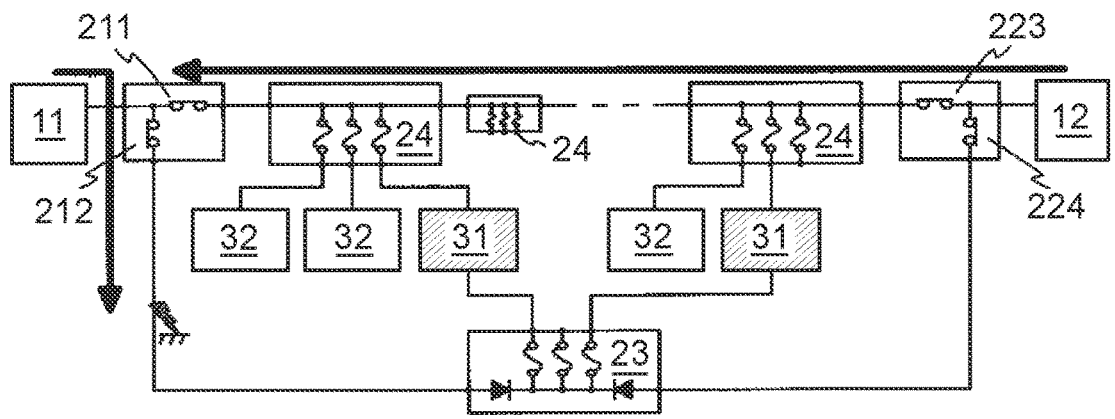
FIG. 3A is a view illustrating control performed by the electric power supply system according to the first embodiment.
Figure 3B:
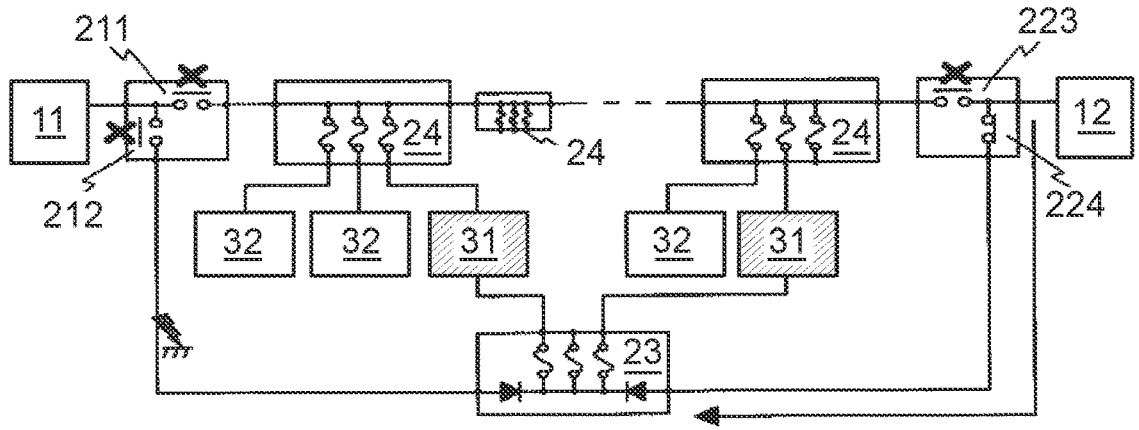
FIG. 3B is a view illustrating control performed by the electric power supply system according to the first embodiment.

Besides, when a ground fault occurs at a location shown in FIG. 3A (on the second route), a large current flows from the first electric power supply unit 11 toward the location of the ground fault via the second switch 212, and a large current flows from the second electric power supply unit 12 toward the location of the ground fault via the third switch 223, the first switch 211, and the second switch 212. In this case, as shown in FIG. 3B, the first switch 211, the second switch 212, and the third switch 223 carry out disconnection upon detecting the flow of an overcurrent. Due to this control, the location of the ground fault is separated from the first electric power supply unit 11 and the second electric power supply unit 12, and the supply of electric power from the second electric power supply unit 12 to the plurality of the first loads 31 via the fourth route is continued.

Figure 4A:
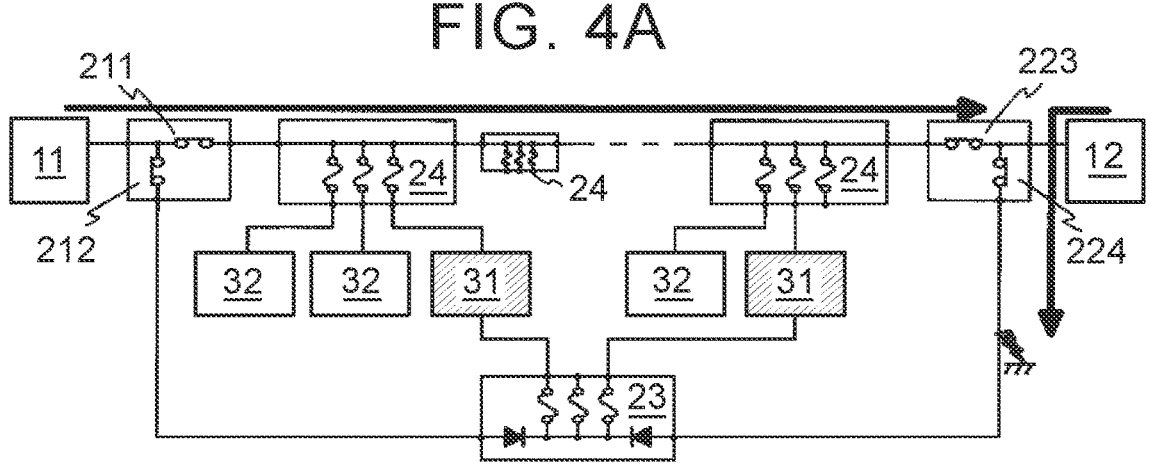
FIG. 4A is a view illustrating control performed by the electric power supply system according to the first embodiment.
Figure 4B:
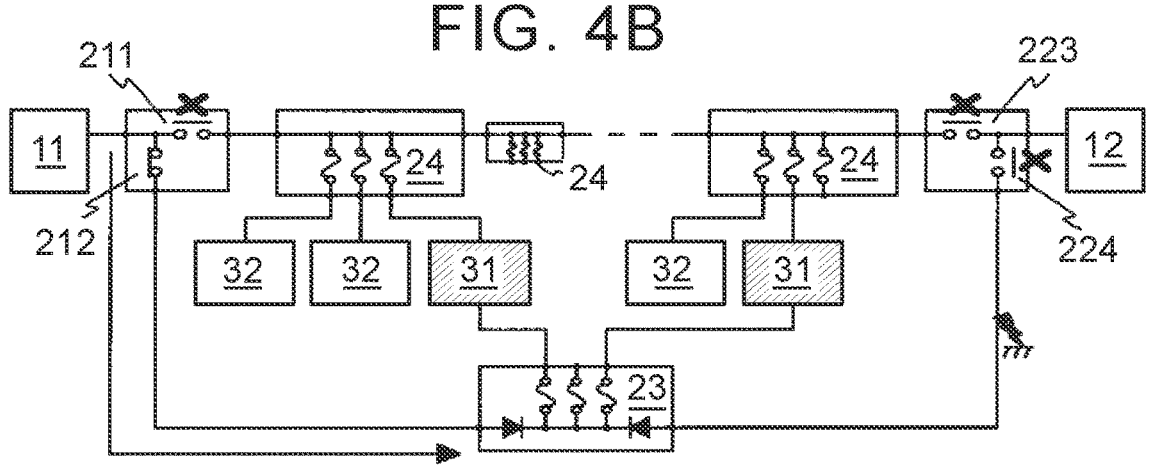
FIG. 4B is a view illustrating control performed by the electric power supply system according to the first embodiment.

Besides, when a ground fault occurs at a location shown in FIG. 4A (on the fourth route), a large current flows from the first electric power supply unit 11 toward the location of the ground fault via the first switch 211, the third switch 223, and the fourth switch 224, and a large current flows from the second electric power supply unit 12 toward the location of the ground fault via the fourth switch 224. In this case, as shown in FIG. 4B, the first switch 211, the third switch 223, and the fourth switch 224 carry out disconnection upon detecting the flow of an overcurrent. Due to this control, the location of the ground fault is separated from the first electric power supply unit 11 and the second electric power supply unit 12, and the supply of electric power from the first electric power supply unit 11 to the plurality of the first loads 31 via the second route is continued.

Figure 5A:
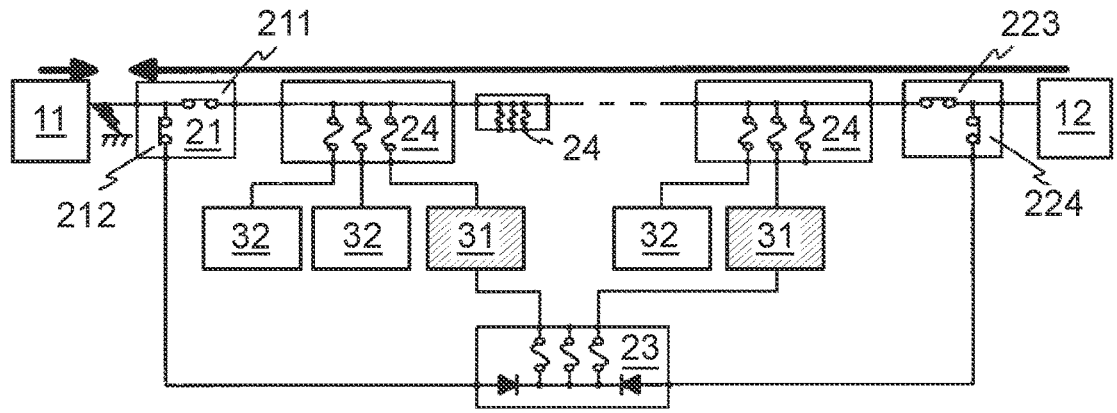
FIG. 5A is a view illustrating control performed by the electric power supply system according to the first embodiment.
Figure 5B:
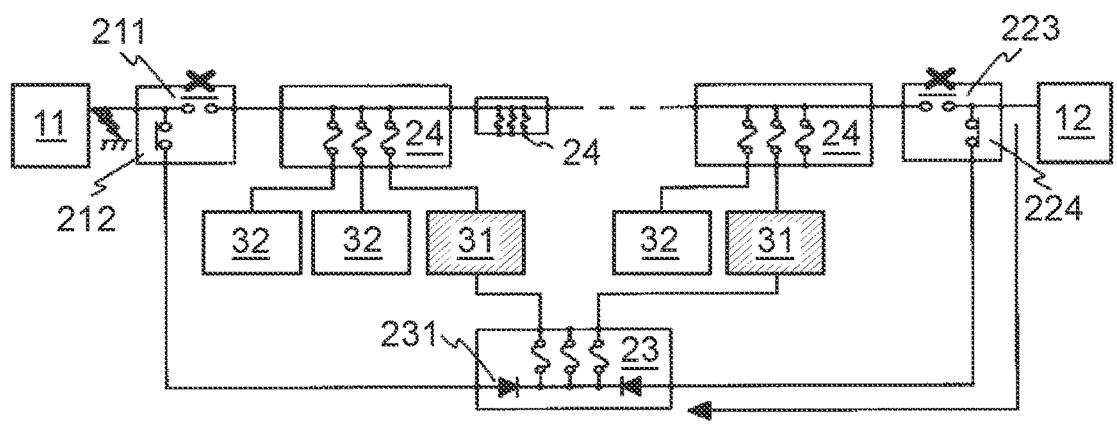
FIG. 5B is a view illustrating control performed by the electric power supply system according to the first embodiment.

Besides, when a ground fault occurs at a location shown in FIG. 5A (between the first electric power supply unit 11 and the first connection changeover unit 21), a large current directly flows from the first electric power supply unit 11 toward the location of the ground fault, and a large current flows from the second electric power supply unit 12 toward the location of the ground fault via the third switch 223 and the first switch 211. In this case, as shown in FIG. 5B, the first switch 211 and the third switch 223 carry out disconnection upon detecting the flow of an overcurrent. Due to this control, the location of the ground fault is separated from the second electric power supply unit 12, and the supply of electric power from the second electric power supply unit 12 to the plurality of the first loads 31 via the fourth route is continued. Incidentally, the second switch 212 remains connected due to the absence of detection of an overcurrent, but prevents a large current from flowing from the second electric power supply unit 12 toward the location of the ground fault through the operation of the first rectifying device 231.

Figure 6A:
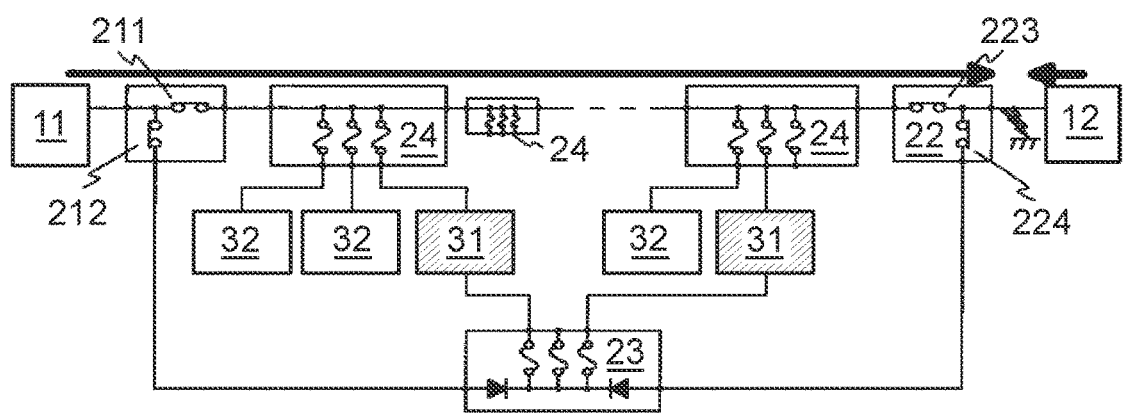
FIG. 6A is a view illustrating control performed by the electric power supply system according to the first embodiment.
Figure 6B:
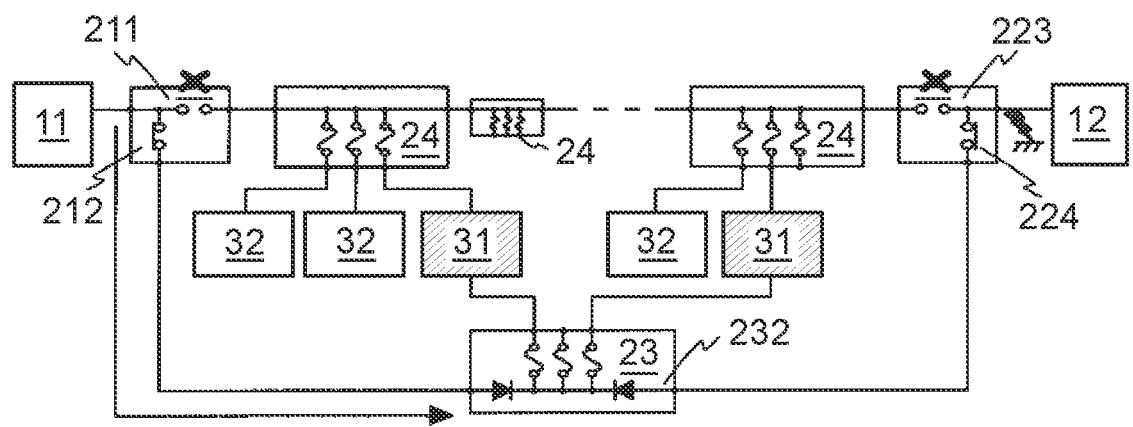
FIG. 6B is a view illustrating control performed by the electric power supply system according to the first embodiment.

Besides, when a ground fault occurs at a location shown in FIG. 6A (between the second electric power supply unit 12 and the second connection changeover unit 22), a large current directly flows from the second electric power supply unit 12 toward the location of the ground fault, and a large current flows from the first electric power supply unit 11 toward the location of the ground fault via the first switch 211 and the third switch 223. In this case, as shown in FIG. 6B, the first switch 211 and the third switch 223 carry out disconnection upon detecting the flow of an overcurrent. Due to this control, the location of the ground fault is separated from the first electric power supply unit 11, and the supply of electric power from the first electric power supply unit 11 to the plurality of the first loads 31 via the second route is continued. Incidentally, the fourth switch 224 remains connected due to the absence of detection of an overcurrent, but prevents a large current from flowing from the first electric power supply unit 11 toward the location of the ground fault through the operation of the second rectifying device 232.

[Operation and Effect]

As described above, the electric power supply system 1 according to the first embodiment employs the first to fourth switches 211, 212, 223, and 224 that carry out disconnection when an overcurrent flows therethrough, and the first and second rectifying devices 231 and 232, and configures the first route that is connected to the first electric power supply unit 11 via the first switch 211, the second route that is connected to the first electric power supply unit 11 via the second switch 212 and the first rectifying device 231, the third route that is connected to the second electric power supply unit 12 via the third switch 223, and the fourth route that is connected to the second electric power supply unit 12 via the fourth switch 224 and the second rectifying device 232, as routes for supplying electric power to the first loads 31 as important loads.

Owing to this configuration, even when a ground fault, namely, the flow of an overcurrent through one of the routes or the like occurs, the route through which the overcurrent has flowed can be separated from the other routes. In consequence, even in the case where no battery for backup is provided, the supply of electric power to the first loads 31 as important loads in case of emergency can be maintained, through the use of the first electric power supply unit 11 and/or the second electric power supply unit 12 that are/is connected to the other route(s).

Second Embodiment

[Configuration]

Figure 7:
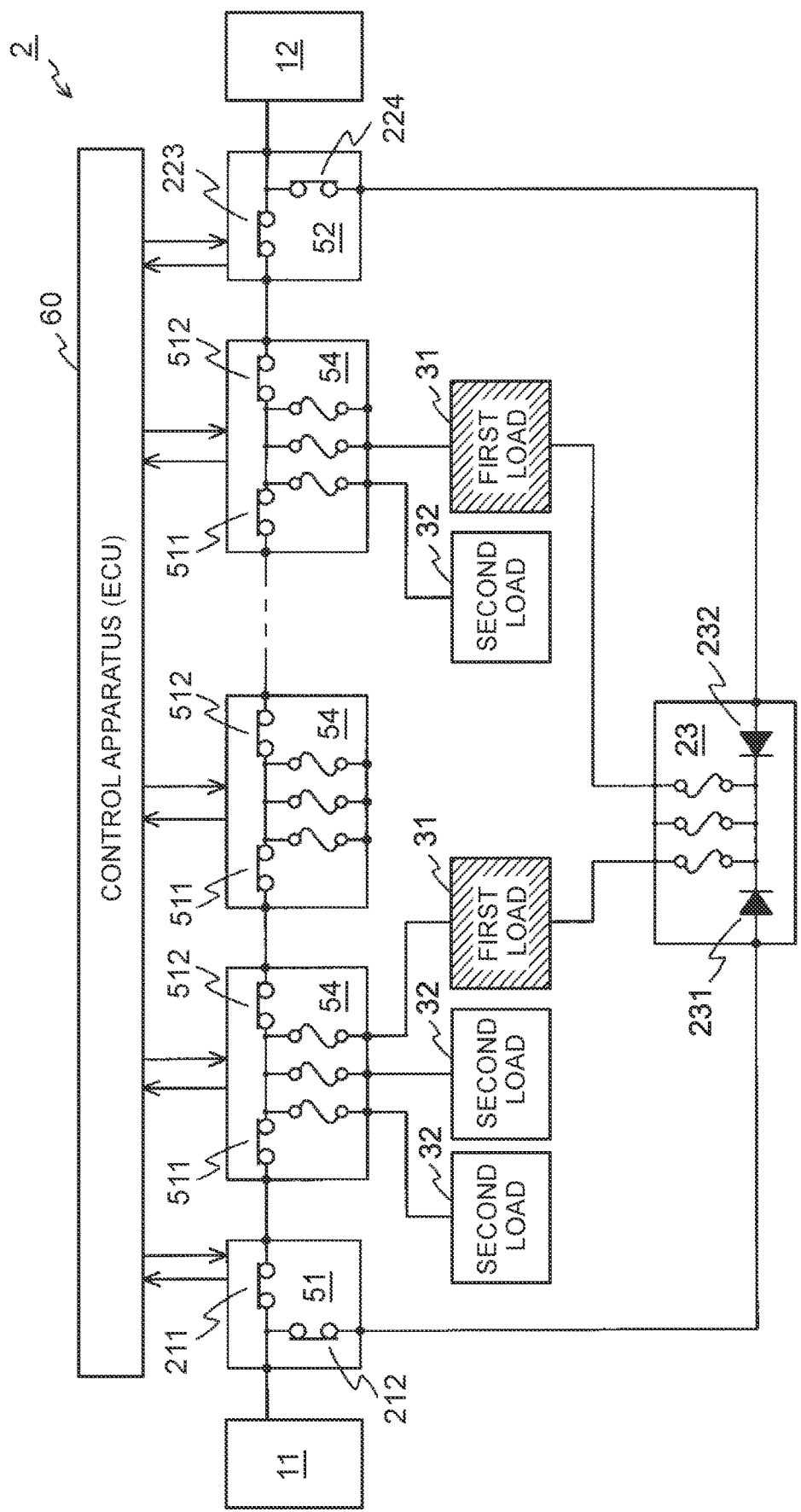
FIG. 7 is a view showing the overall configuration of an electric power supply system according to the second embodiment of the disclosure.

FIG. 7 is a view showing the overall configuration of an electric power supply system 2 according to the second embodiment. The configuration of the electric power supply system 2 exemplified in FIG. 7 is obtained by replacing the first connection changeover unit 21 with a first connection changeover unit 51, replacing the second connection changeover unit 22 with a second connection changeover unit 52, replacing the plurality of the distributors 24 with a plurality of distributors 54, and further adding a control apparatus 60 in the configuration of the electric power supply system 1 according to the above-mentioned first embodiment.

The electric power supply system 2 according to the second embodiment will be described hereinafter, focusing on this different configuration. The description of the configuration in which the same reference symbols as in the electric power supply system 1 are used will be omitted as appropriate.

The first connection changeover unit 51 is equipped with the first switch 211 and the second switch 212 that have an overcurrent protection function for disconnecting terminals from each other upon detecting an overcurrent. Furthermore, this first connection changeover unit 51 has a function of conveying the direction in which the overcurrent has flowed through each of the switches to the control apparatus 60, and a function of controlling a connection state of each of the switches based on a command from the control apparatus 60.

The second connection changeover unit 52 is equipped with the third switch 223 and the fourth switch 224, which have an overcurrent protection function for disconnecting terminals from each other upon detecting an overcurrent. Furthermore, this second connection changeover unit 52 has a function of conveying the direction in which the overcurrent has flowed through each of the switches to the control apparatus 60, and a function of controlling a connection state of each of the switches based on a command from the control apparatus 60.

The plurality of the distributors 54 are each provided between the first switch 211 and the third switch 223, and are configured to distribute and supply the electric power from the electric power supply of the first line to the plurality of the first loads 31 and the plurality of the second loads 32. Each of the distributors 54 is equipped with switches 511 and 512, which have an overcurrent protection function for disconnecting terminals from each other upon detecting an overcurrent, between a branch point at which a distribution line branches off and one terminal and between the branch point and the other terminal, respectively. Furthermore, each of the distributors 54 has a function of conveying information on the flow of an overcurrent through each of the switches and the direction in which the overcurrent has flowed to the control apparatus 60, and a function of controlling a connection state of each of the switches based on a command from the control apparatus 60.

The control apparatus (an electronic control unit (an ECU)) 60 receives information on the presence/absence of an overcurrent through each of the switches and the direction in which the current flows, from the first connection changeover unit 51, the second connection changeover unit 52, and the plurality of the distributors 54. Then, the control apparatus 60 specifies, based on the received information, a location of the occurrence of an abnormality of the flow of an overcurrent, such as a ground fault or the like, and commands the first connection changeover unit 51, the second connection changeover unit 52, and the plurality of the distributors 54 to control connection states of the switches in such a manner as to separate the specified location of the abnormality from the first electric power supply unit 11 and the second electric power supply unit 12.

[Control]

Next, the control performed by the electric power supply system 2 according to the second embodiment will be described with further reference to FIGS. 8A to 8C. Each of the drawings is a view exemplifying a control state at the time when an abnormality, namely, the flow of an overcurrent through a ground fault occurs between a distributor 54a and a distributor 54b. Incidentally, in a normal state before the occurrence of the ground fault in each of the drawings, electric power is supplied in a parallel manner to the plurality of the first loads 31 and the plurality of the second loads 32 through the use of both the first line and the second line.

Figure 8A:
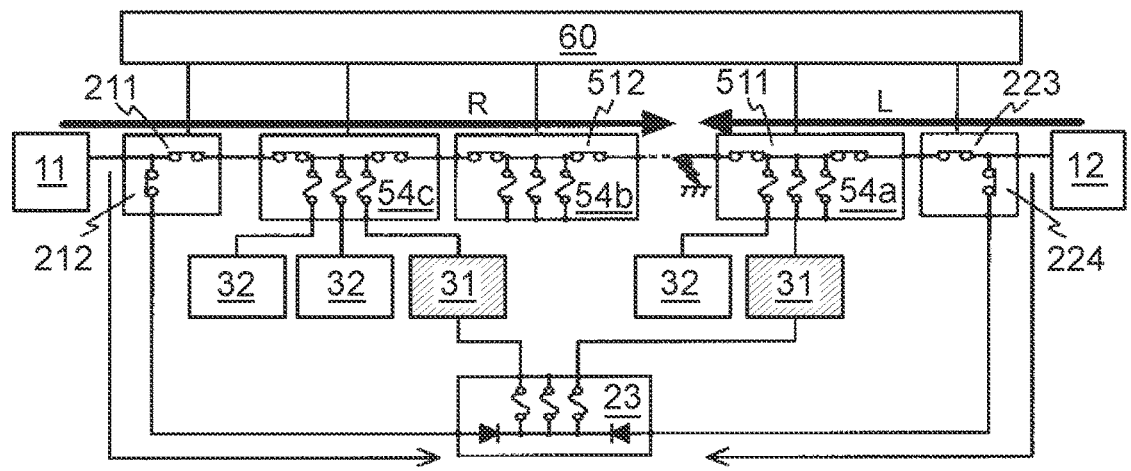
FIG. 8A is a view illustrating control performed by the electric power supply system according to the second embodiment.

When a ground fault occurs at a location shown in FIG. 8A, a large current flows from the first electric power supply unit 11 toward the location of the ground fault via the first switch 211, a distributor 54c, and the distributor 54b, and a large current flows from the second electric power supply unit 12 toward the location of the ground fault via the third switch 223 and the distributor 54a.

Figure 8B:
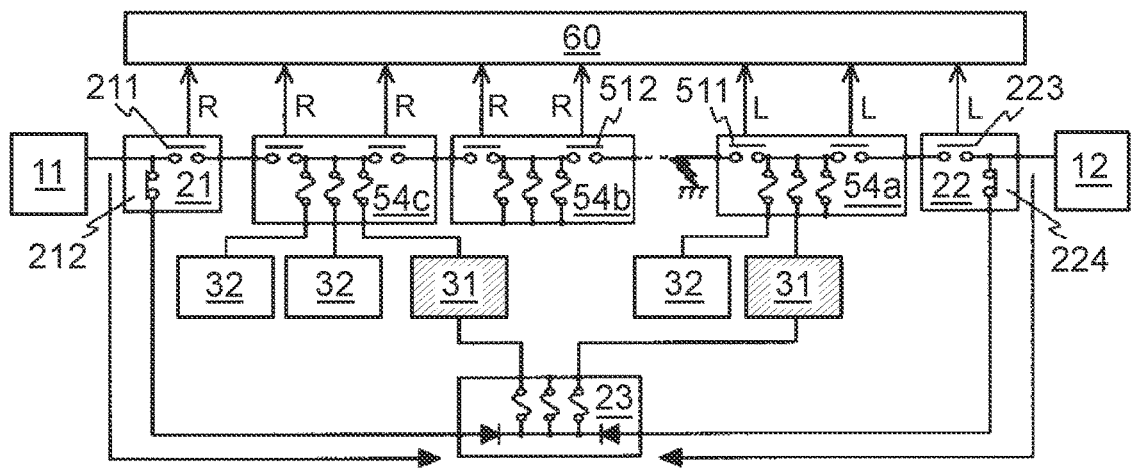
FIG. 8B is a view illustrating control performed by the electric power supply system according to the second embodiment.
Figure 8C:
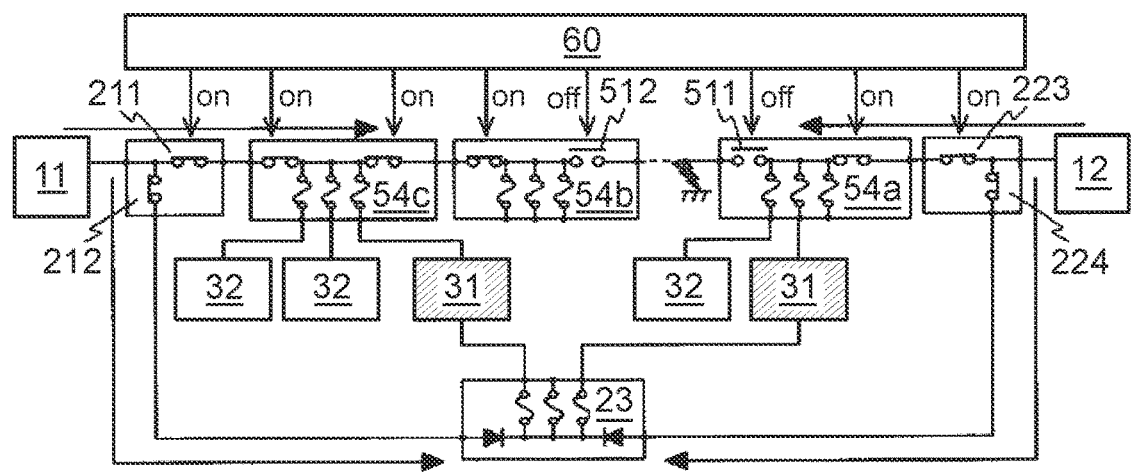
FIG. 8C is a view illustrating control performed by the electric power supply system according to the second embodiment.

In this case, as shown in FIG. 8B, the first connection changeover unit 21 disconnects the first switch 211, and conveys the flow of an overcurrent and a direction R in which the overcurrent has flowed (a direction from the first electric power supply unit 11 to the second electric power supply unit 12) to the control apparatus 60. The distributor 54c and the distributor 54b disconnect all the switches, and convey the flow of an overcurrent and the direction R in which the overcurrent has flowed to the control apparatus 60. The second connection changeover unit 22 disconnects the third switch 223, and conveys the flow of an overcurrent and a direction L in which the overcurrent has flowed (a direction from the second electric power supply unit 12 to the first electric power supply unit 11) to the control apparatus 60. The distributor 54a disconnects all the switches, and conveys the flow of an overcurrent and the direction L in which the overcurrent has flowed to the control apparatus 60.

The control apparatus 60 specifies the location of the ground fault based on the information conveyed from the first connection changeover unit 21, the second connection changeover unit 22, the distributor 54a, the distributor 54b, and the distributor 54c. Then, as shown in FIG. 8C, with a view to separating this specified location of the ground fault, the control apparatus 60 commands the first connection changeover unit 21, the second connection changeover unit 22, and the distributors 54a to 54c to disconnect (off) only the switch 511 of the distributor 54a and the switch 512 of the distributor 54b and connect the other switches (on).

The first connection changeover unit 21, the second connection changeover unit 22, and the distributors 54a to 54c, which have been commanded by the control apparatus 60, change over connection states of the first to fourth switches 211, 212, 223, and 224 and the switches 511 and 512 of the respective distributors 54 in accordance with the command.

[Operation and Effect]

As described above, the electric power supply system 2 according to the second embodiment employs the control apparatus 60 that controls the plurality of the switches such as the first to fourth switches 211, 212, 223, and 224, the switches 511 and 512 of the respective distributors 54, and the like, specifies the location where the overcurrent has occurred, based on information on the overcurrent conveyed from the plurality of the switches, and changes over the connection states of the plurality of the switches such that the specified location is separated from the routes.

Due to this control, only the switch closest to the abnormal location where the ground fault has occurred can be disconnected, so the abnormal location can be separated from the first electric power supply unit 11 and/or the second electric power supply unit 12 within a range with a rather weak influence. Accordingly, it is also possible to continue to supply electric power to the second loads 32 other than the first loads 31, which can be supplied with electric power from the first electric power supply unit 11 and the second electric power supply unit 12.

First Modification Example

Figure 9:
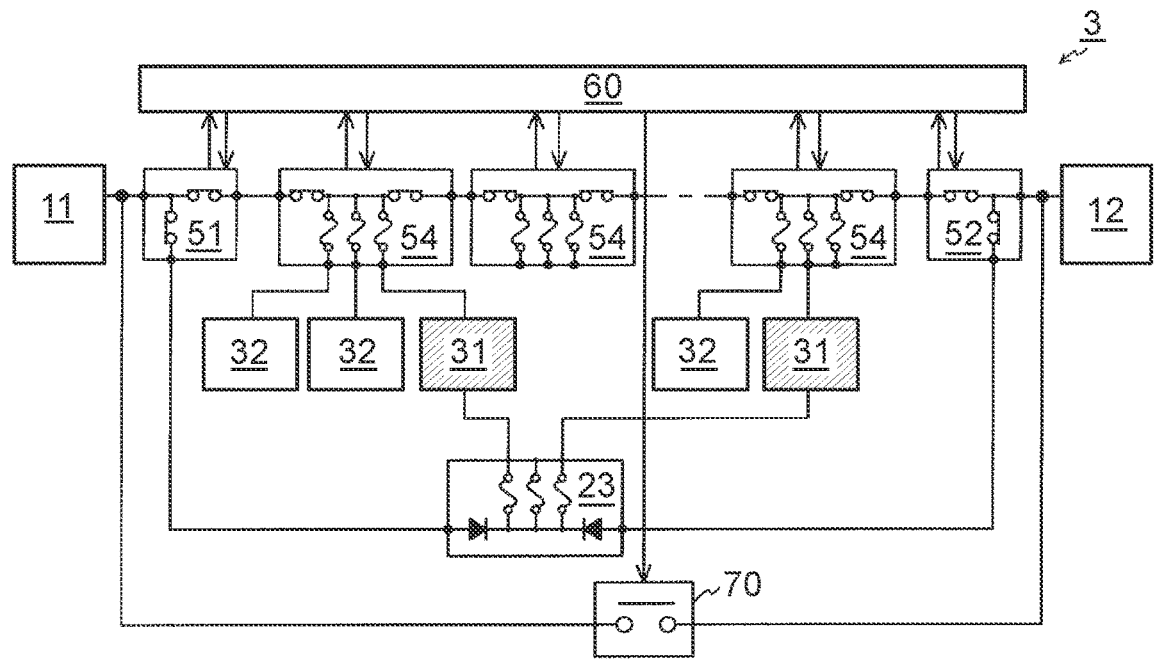
FIG. 9 is a view showing the overall configuration of an electric power supply system according to a first modification example of an aspect of the disclosure.

As is the case with an electric power supply system 3 shown in FIG. 9, the configuration of the electric power supply system 2 according to the aforementioned second embodiment may be further provided with a connection control unit 70 that connects the first electric power supply unit 11 and the second electric power supply unit 12 to each other based on a command from the control apparatus 60, after each of the plurality of the switches makes a changeover in connection state based on the command from the control apparatus 60.

Owing to the configuration of this electric power supply system 3, even after an abnormality such as a ground fault or the like has occurred, electric power can be made available between the first electric power supply unit 11 and the second electric power supply unit 12. In consequence, for example, in the case where the first electric power supply unit 11 is a generator and the second electric power supply unit 12 is a battery, even when fluctuations in voltage occur in the generator, the battery can absorb the fluctuations.

Besides, in this case, even when the discharge of the battery progresses, the battery can be charged by the generator.

Second Modification Example

Figure 10:
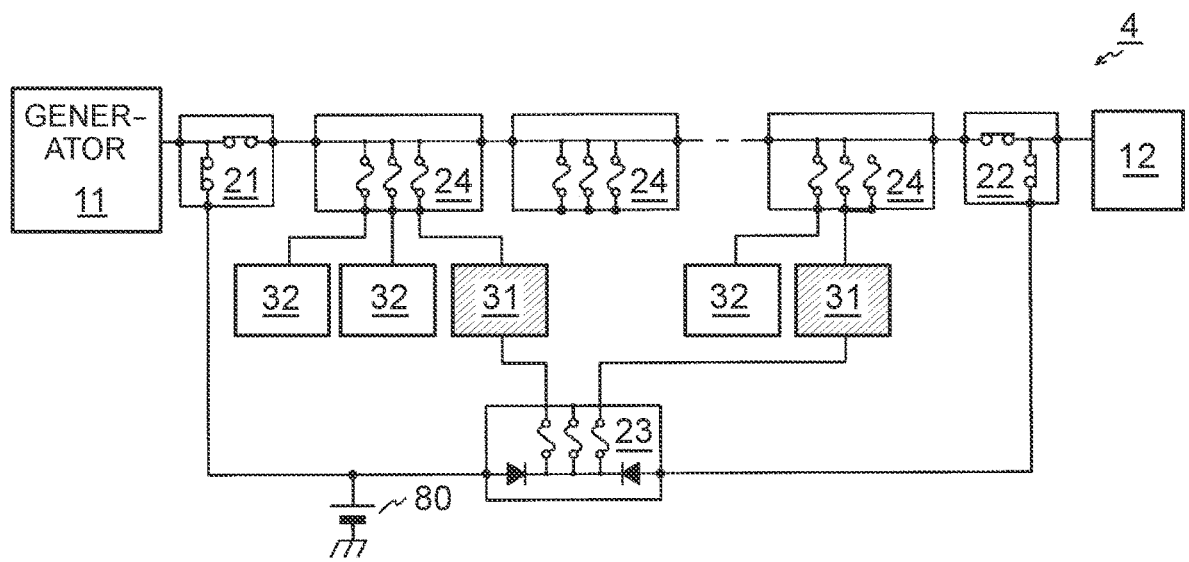
FIG. 10 is a view showing the overall configuration of an electric power supply system according to a second modification example of the aspect of the disclosure.

As is the case with an electric power supply system 4 shown in FIG. 10, a small-capacity battery 80 as a countermeasure against fluctuations in voltage may be added on the route of the second line on the side where the generator 11 is connected, in the configuration of the electric power supply system 1 according to the aforementioned first embodiment. In this manner as well, the fluctuations in voltage occurring in the generator 11 can be absorbed.

Besides, each of the first switch 211, the second switch 212, the third switch 223, and the fourth switch 224 may employ a mechanical fuse as long as a delay in the operation of disconnecting the terminals from each other upon detecting an overcurrent causes no problem.

Reference Example

In the configuration of the electric power supply system 2 according to the aforementioned second embodiment, if a delay time from the occurrence of an abnormality such as a ground fault or the like to the issuance of a command to make a changeover in connection to the respective switches by the control apparatus 60 for the purpose of specifying the abnormal location and separating the abnormal location is permissible, it is also possible to omit the wiring of the second line that is constituted of the second switch 212, the fourth switch 224, and the rectifier-equipped distributor 23.

The electric power supply system according to the aspect of the disclosure can be utilized in a vehicle that is equipped with two electric power supply lines for supplying electric power to loads, or the like.

What is claimed is:
1. An electric power supply system comprising:
a first electric power supply unit;
a second electric power supply unit;
a load configured to be supplied with electric power from the first electric power supply unit and the second electric power supply unit, the load including a first load which is an important load and a second load which is a general load;
a first switch configured to
connect, through a first route, the first electric power supply unit to the first load and the second load, and
disconnect the first electric power supply unit from the first load and the second load when an overcurrent flows through the first route;
a second switch configured to
connect, through a second route, the first electric power supply unit to the first load, and
disconnect the first electric power supply unit from the first load when an overcurrent flows through the second route;
a third switch configured to
connect, through a third route, the second electric power supply unit to the first load and the second load, and
disconnect the second electric power supply unit from the first load and the second load when an overcurrent flows through the third route;
a fourth switch configured to
connect, through a fourth route, the second electric power supply unit to the first load, and
disconnect the second electric power supply unit from the first load when an overcurrent flows through the fourth route;
a first rectifying device provided in the second route and configured to carry out rectification from the first electric power supply unit toward the first load; and
a second rectifying device provided in the fourth route and configured to carry out rectification from the second electric power supply unit toward the first load, wherein:
the first load is connected to the first electric power supply unit via the first route and the second route, and is connected to the second electric power supply unit via the third route and the fourth route;
the second load is connected to the first electric power supply unit via the first route, and is connected to the second electric power supply unit via the third route;
when a ground fault occurs on the first route,
the first switch is turned off, due to the overcurrent on the first route, to disconnect the first electric power supply unit from the first load and the second load on the first route,
the third switch is turned off, due to the overcurrent on the third route, to disconnect the second electric power supply unit from the first load and the second load on the third route, and
the first load is supplied with electric power from the first electric power supply unit by the second route via the second switch, and is supplied with electric power from the second electric power supply unit by the fourth route via the fourth switch;
when a ground fault occurs on the second route,
the first switch is turned off, due to the overcurrent on the first route, to disconnect the first electric power supply unit from the first load and the second load on the first route,
the second switch is turned off, due to the overcurrent on the second route, to disconnect the first electric power supply unit from the first load on the second route,
the third switch is turned off, due to the overcurrent on the third route, to disconnect the second electric power supply unit from the first load and the second load on the third route, and
the first load is supplied with electric power from the second electric power supply unit by the fourth route via the fourth switch;
when a ground fault occurs on the fourth route,
the first switch is turned off, due to the overcurrent on the first route, to disconnect the first electric power supply unit from the first load and the second load on the first route,
the third switch is turned off, due to the overcurrent on the third route, to disconnect the second electric power supply unit from the first load and the second load on the third route,
the fourth switch is turned off, due to the overcurrent on the fourth route, to disconnect the second electric power supply unit from the first load on the fourth route, and
the first load is supplied with electric power from the first electric power supply unit by the second route via the second switch;
when a ground fault occurs between the first electric power supply unit and the first switch, the first switch is turned off, due to the overcurrent on the first route, to disconnect the first electric power supply unit from the first load and the second load on the first route, the third switch is turned off, due to the overcurrent on the third route, to disconnect the second electric power supply unit from the first load and the second load on the third route, the first rectifying device suppresses an overcurrent flowing from the second electric power supply unit to a location of the ground fault via the second switch and the fourth switch, and the first load is supplied with electric power from the second electric power supply unit by the fourth route via the fourth switch; and when a ground fault occurs between the second electric power supply unit and the third switch, the first switch is turned off, due to the overcurrent on the first route, to disconnect the first electric power supply unit from the first load and the second load on the first route, the third switch is turned off, due to the overcurrent on the third route, to disconnect the second electric power supply unit from the first load and the second load on the third route, the second rectifying device suppresses an overcurrent flowing from the first electric power supply unit to a location of the ground fault via the second switch and the fourth switch, and the first load is supplied with electric power from the first electric power supply unit by the second route via the second switch.

2. The electric power supply system according to claim 1, comprising:

a control apparatus configured to control a plurality of switches including the first to fourth switches and one or more switches other than the first to fourth switches, wherein each of the plurality of the switches is configured to convey information on flow of overcurrent and a direction of flow of overcurrent to the control apparatus, the control apparatus is configured to
specify an occurrence location where an overcurrent has occurred, based on the information conveyed by the plurality of the switches, and issue a command on a connection state to each of the plurality of the switches so as to separate the occurrence location from a route used to supply electric power, and each of the plurality of the switches is configured to make a changeover in connection state based on the command from the control apparatus.

3. The electric power supply system according to claim 2, comprising:

a connection control unit configured to connect the first electric power supply unit and the second electric power supply unit to each other after each of the plurality of the switches makes the changeover in connection state based on the command from the control apparatus.

4. The electric power supply system according to claim 1, wherein the first electric power supply unit is a generator, and
the second electric power supply unit is a battery.

* * * * *